United States Patent
Humphrey et al.

(10) Patent No.: US 7,939,967 B2
(45) Date of Patent: May 10, 2011

(54) MULTIPLE POWER SUPPLY CONTROL

(75) Inventors: Daniel Humphrey, Houston, TX (US);
Amin Bemat, Cypress, TX (US);
Reynaldo Domingo, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 208 days.

(21) Appl. No.: 12/491,773

(22) Filed: Jun. 25, 2009

(65) Prior Publication Data

US 2010/0327656 A1 Dec. 30, 2010

(51) Int. Cl.
*H02J 9/00* (2006.01)
(52) U.S. Cl. .................................................. 307/65
(58) Field of Classification Search .............. 307/65
See application file for complete search history.

(56) References Cited

U.S. PATENT DOCUMENTS

| | | | |
|---|---|---|---|
| 4,860,188 A | 8/1989 | Bailey | |
| 5,200,643 A | 4/1993 | Brown | |
| 5,675,480 A | 10/1997 | Sanford | |
| 5,894,413 A * | 4/1999 | Ferguson | 363/65 |
| 7,082,042 B2 | 7/2006 | Harris | |
| 7,368,832 B2 | 5/2008 | Peck | |
| 7,436,950 B2 | 10/2008 | Chheda | |
| 7,701,089 B2 * | 4/2010 | Shimizu | 307/80 |
| 2008/0191552 A1 | 8/2008 | Suzuki | |
| 2009/0224603 A1* | 9/2009 | Perper et al. | 307/43 |

* cited by examiner

*Primary Examiner* — Robert L. Deberadinis

(57) ABSTRACT

Apparatus and methods are provided. A system includes two or more power supplies receiving electrical energy from respective independent sources. One of the power supplies detects an anomalous condition of the associated energy source and provides an alert signal. At least one of the other power supplies transitions from a standby mode to a normal output mode in response to the alert signal. The failing power supply provides operating level energy to an electrical load while the one or more other power supplies transition from standby to normal output level.

15 Claims, 3 Drawing Sheets

MULTIPLE POWER SUPPLY CONTROL

BACKGROUND

Various devices and systems use multiple power supplies in order to increase reliability or "up time" through redundancy. In a typical scenario, each operating power supply bears an approximately equal share of the load. However, such a balanced load sharing approach often results in each power supply operating with less than optimum efficiency. The present teachings address the foregoing and other concerns.

BRIEF DESCRIPTION OF THE DRAWINGS

The present embodiments will now be described, by way of example, with reference to the accompanying drawings, in which.

DETAILED DESCRIPTION

Introduction

Means and methods for providing redundant power supplies are described. An illustrative system includes two or more power supplies each coupled to electrical energy at respective independent source. One of the power supplies detects an anomalous condition in the associated energy source and provides an alert signal. At least one of the other power supplies transitions from a standby mode to a normal output mode in response to the alert signal. The failing power supply provides operating level energy to an electrical load while the one or more respondent power supplies transition from standby to normal output levels.

In one embodiment, an apparatus includes a first power supply coupled to an electrical load and a first source of electrical energy. The first power supply is configured to issue an alert signal indicative of a failure condition of the first source of electrical energy. The apparatus also includes a second power supply coupled to the electrical load and a second source of electrical energy. The second power supply is configured to transition from a lesser output level to a greater output level in response to an activation signal.

In another embodiment, a system includes an electrical load and a first power supply. The first power supply is coupled to a first independent source of electricity and to the electrical load. The first power supply is configured to provide a first alert signal indicative of an anomalous condition of the first independent source of electricity. The system also includes a second power supply coupled to a second independent source of electricity and to the electrical load. The second power supply is configured to provide a second alert signal indicative of an anomalous condition of the second independent source of electricity. The first power supply is further configured to transition from a lesser output level to a greater output level in response to a first activation signal. The second power supply is further configured to transition from a lesser output level to a greater output level in response to a second activation signal.

In yet another embodiment, a method includes asserting a signal responsive to an anomalous condition of a first independent source of electrical energy. The first independent source of electrical energy is coupled to energize a first power supply. The method also includes transitioning a second power supply from a standby output level to a normal output level responsive to the signal. The second power supply is energized by a second independent source of electrical energy. The method further includes providing operating power from the first power supply to an electrical load during the transitioning.

First Illustrative Embodiment

Figure 1:
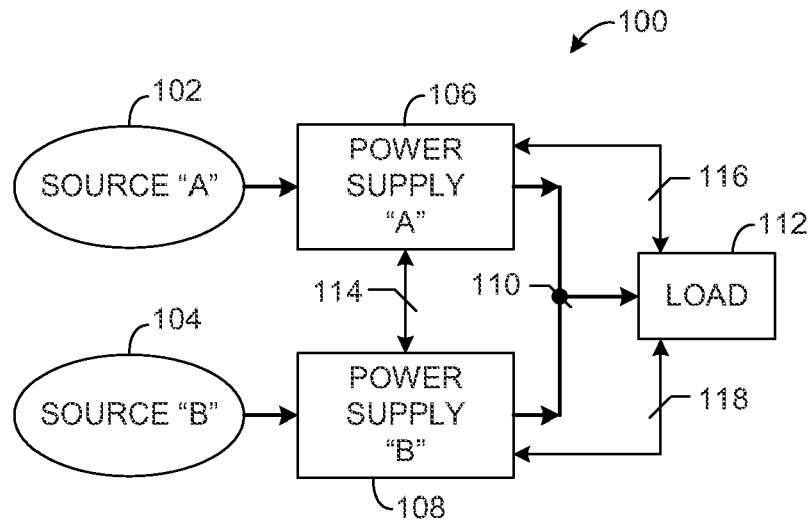
FIG. 1 depicts a block diagram of a system according to one embodiment.

Reference is now directed to FIG. 1, which depicts a block diagrammatic view of a system 100. The system 100 is illustrative and non-limiting with respect to the present teachings. Thus, other systems can be configured and operated in accordance with the present teachings.

The system 100 includes two independent sources of electrical energy (sources) 102 and 104, respectively. The source 102 is also designated source "A", while the source 104 is designated source "B" for purposes of simplicity. Each source 102 and 104 is autonomous and operates without dependence or interaction with the other. For purpose of non-limiting example, each of the sources 102 and 104 can be defined by a respective power distribution utility, a generator set, an inverter powered by solar or wind energy, etc. Other configurations or definitions of the independent energy sources 102 and 104 are also possible. A failure of one of the sources 102 and 104 is presumed, in and of itself, to have no affect on the other. Thus, the sources 102 and 104 are redundant with respect to the balance of the system 100.

The system 100 also includes a first power supply 106, also designated as power supply "A". The system 100 further includes a second power supply 108, also designated as power supply "B". The power supplies 106 and 108 are energized by the sources 102 and 104, respectively. Each of the power supplies is coupled to provide conditioned power 110 to a load 112. Thus, each power supply "A" and "B" (106 and 108) is configured to perform voltage regulation, current limiting, or other operations.

Each power supply 106 and 108 is configured to provide for at least a portion of the electrical needs of the load 112. In one embodiment, each of the power supplies 106 and 108 is capable of providing all operating power 110 to the load 112, such that complete redundancy is provided within the system 100.

Additionally, the power supplies 106 and 108 can be respectively configured and coupled to one another so as to bidirectionally exchange signals 114. Such signals 114 can includes status information, alerts and other signals as various events occur making such communications relevant. In the alternative, power supply 106 can be coupled to the load 112 so as to communicate signals 116, while power supply 108 can be coupled to the load 112 so as to communicate signals 118. In this alternative way, each power supply 106 and 108 can communicate respective signals 116 and 118 to the load 112. In turn, the load 112 is configured to respond by relaying the same signal or another corresponding signal to the other power supply 106 or 108.

Power supplies 106 and 108 can respectively include any circuitry, processor(s) or other resources as needed in order to perform in accordance with the present teachings. Such resources can include, for purposes of non-limiting illustration, one or more state machines, digital logic, analog circuitry, digital/analog hybrid circuitry, one or more processors or microcontrollers, lookup tables, voltage or current sensing elements, etc. One having ordinary skill in the electrical and related arts will appreciate that sensing and signaling instrumentation is well known, and that further particular elaboration is not required for an understanding of the present teachings.

Illustrative operation of the system 100 is described below with respect to FIG. 2.

First Illustrative Method

Figure 2:
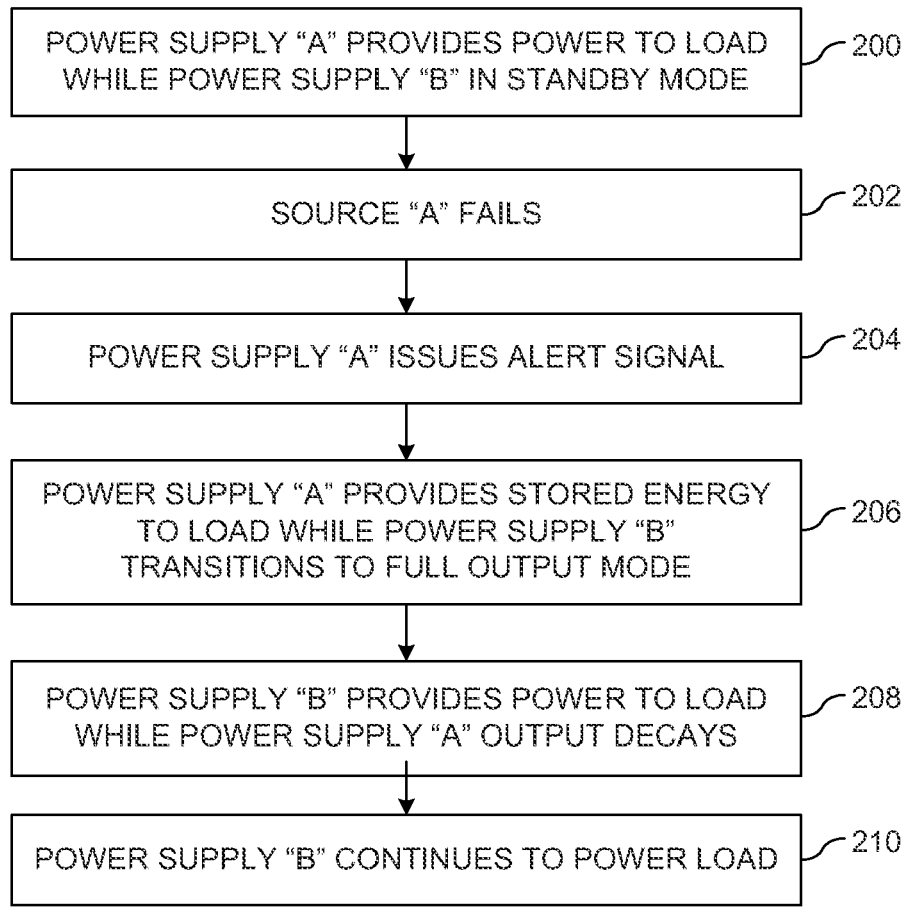
FIG. 2 depicts a flow diagram of a method according to one embodiment.

FIG. 2 is a flow diagram depicting a method according to one embodiment of the invention. The method of FIG. 2 includes particular operations and order of execution. However, other methods including other operations, omitting one or more of the depicted operations, and/or proceeding in other orders of execution can also be used according to the present teachings. Thus, the method of FIG. 2 is illustrative and non-limiting in nature.

At 200, a first power supply provides all needed operating power to a load, while a second power supply operates in a standby mode. For purpose of illustrative example, it is assumed that the power supply "A" 106 provides all needed conditioned power 110 to a load 112. It is also assumed that the power supply "B" 108 operates in a standby mode, providing no power output to the load 112.

At 202, a first independent source of energy fails. For purposes of the ongoing example, it is assumed that independent source "A" 102 fails in a low-voltage or no-voltage condition. Other anomalous conditions of the source 102 can also occur.

At 204, the first power supply detects the anomalous (failed) condition of the first independent energy source and issues a corresponding input fault signal. For purposes of example, it is assumed that power supply "A" 106 detects the failed condition of source 102 and issues an input fault signal 114 to power supply "B" 108. The input fault signal can also be referred to as an alert signal 114.

At 206, the first power supply continues to provide energy from storage to the load while the second power supply transitions to a full (i.e., normal) output mode. For purposes of the example, it is assumed that the power supply 106 includes capacitors or other internal storage (not shown) sufficient to provide conditioned power 110 to the load 112, while the power supply 108 transitions from standby (i.e., no output) to full power output mode. One of ordinary skill in the electrical arts will appreciate that the use of output filtering, buffering or energy storage capacitors within power supplies is a common practice, and no additional elaboration is required in this regard.

At 208, the second power supply provides full, normal operating power to the load while the first power supply output decays. For purposes of the example, it is assumed that the power supply "B" 108 is now operating at full output, sufficient to provide all needed power to the load 112. Additionally, the power supply "A" 106 output is presumed to decay below useful levels as the internal storage capacitors are discharged.

At 210, the second power supply continues to provide for the needs of the load despite the failed or anomalous condition of the first independent energy source. For purposes of the example, power supply "B" 108 powers the load 112, by virtue of the second independent energy source 104.

The method described is just one of any number of methods contemplated by the present teachings. In general, anticipated failure of a power supply results in the provision of a corresponding alert (or activation) signal or message. Another power supply, operating in a no-output (i.e., standby) mode responds to the signal by transitioning as quickly as possible to a full output operating mode. The soon-to-fail power supply can provide a brief period of normal operating power to a load or loads, by virtue of internal or external energy storage, while the other power supply is in transition.

In this way, a brief period occurs during which the two power supplies are providing respective fractions of the required load power. The responding or "take over" power supply assumes full duty prior to and during the decay and failure of the other power supply. The method allows for each of the power supplies to operate at or near optimum efficiency while providing for the electrical demands of the load being served.

Additionally, the system 100 can, but not necessarily, be further configured such that the power supply "A" 106 is designated as a primary supply, while the power supply "B" 108 is designated as a backup supply. In such a further configuration, restoration of the first independent source of energy 102 results in the power supply "A" 106 issuing a standby signal to the power supply "B" 108. In response, the power supply "B" 108 transitions from full output mode to the standby mode, while the power supply "A" 106 assumes full output operation and provides for the needs of the load 112. It is noted that the "A" and "B" designations of system 100 are arbitrary, and do not necessarily correspond to a hierarchical operating scheme.

The present teachings contemplate various systems in which multiple power supplies of essentially identical output and signaling capabilities are used to provide for redundancy within the respective systems. The method of FIG. 2 is performed in the context of a two source/two power supply system (e.g., system 100). However, the present teachings contemplate substantially equivalent methods that are performed in the context of respective systems having any practical number of independent energy sources and power supplies.

For non-limiting example, a system (not shown) can be provided having a total of four power supplies energized by a total of two independent electrical sources. The power supplies of such a system can be arranged as cooperative pairs coupled to the two respective sources. Thus, the failure of one independent source leaves two power supplies still operational by virtue of the other independent source. Alternatively, two power supplies, each coupled to a respective source, can operate in the interest of load balancing. In this alternative, two standby power supplies are present and coupled to the respective sources. Such a four power supply, two independent source configuration is referred to as a "2+2" scheme. Other redundancy schemes (i.e., N+N) are also contemplated by the present teachings, wherein communication signaling between respective power supplies allows for primary/standby operation at or near optimum efficiency.

Illustrative Signal Diagram

Figure 3:
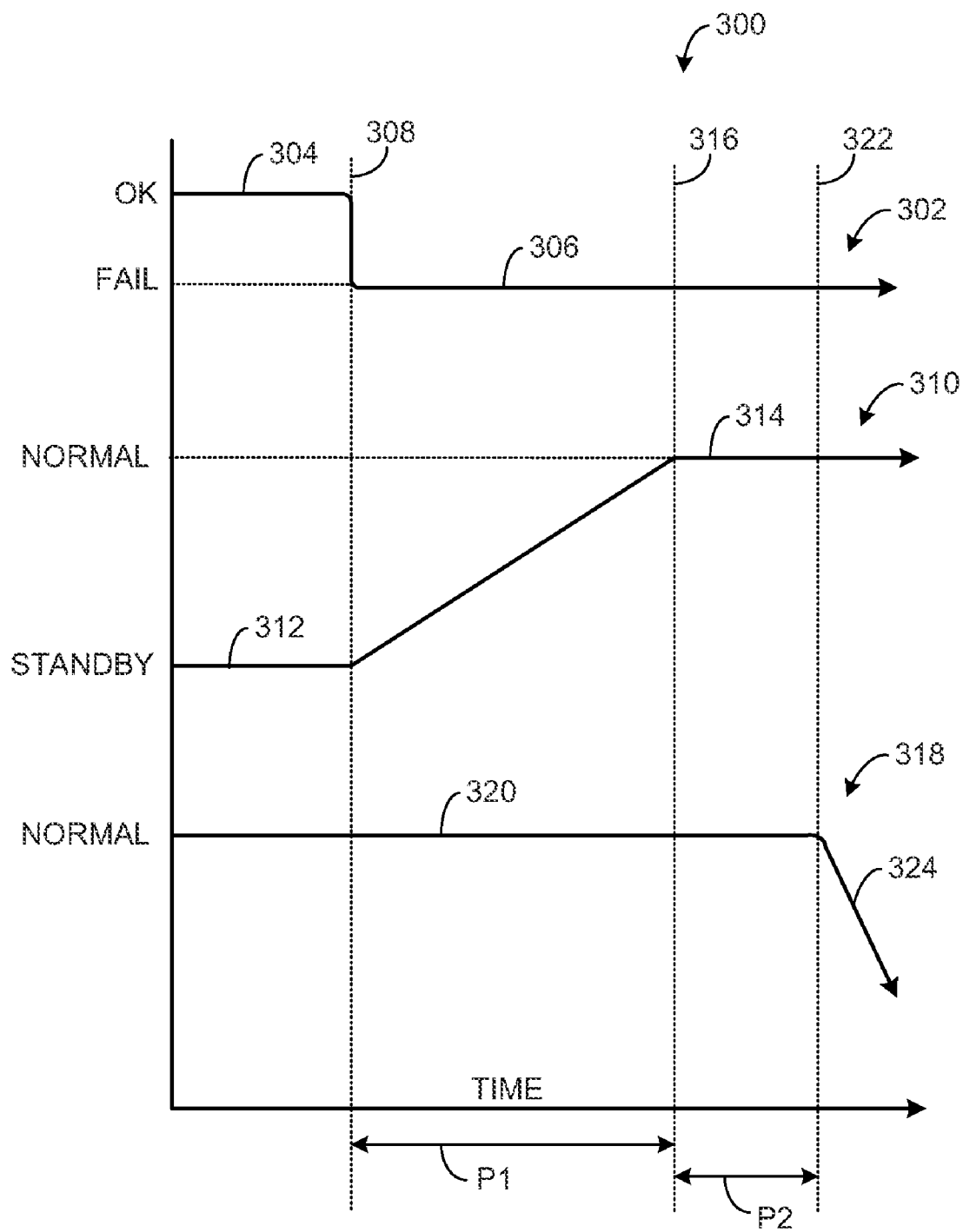
FIG. 3 depicts a signal timing diagram according to an embodiment.

FIG. 3 is a signal timing diagram 300 according to one illustrative and non-limiting embodiment. The diagram 300 is provided for purposes of clarity.

The diagram 300 includes a voltage 302 corresponding to a particular independent source of electrical energy. As depicted, the voltage 302 drops from a normal ("OK") operating level 304 to an insufficient ("FAIL") level 306 at a time 308.

The diagram 300 also includes an output voltage 310 provided by a "standby" power supply "B" of an illustrative redundant system. The voltage 310 is initially at a standby (zero) output level 312. Then, the voltage 310 begins to transition toward a full operating level 314 starting at time 308. It is assumed that the transition from standby level 312 toward full output level 314 is triggered by an alert, activation or other signal provided to power supply "B". The transition of the voltage 310 occurs during a time period P1 from time 308 to a time 316.

The timing diagram 300 further includes an output voltage 318 provided by a "primary" power supply "A" of the illustrative redundant system. It is assumed that the power supply "A" is energized by the independent source of voltage 302. As such, the power supply "A" is deprived of normal input electrical energy beginning at time 308 and thereafter as depicted in FIG. 3.

The voltage 318 is initially at full output (normal operating) level 320. This normal (i.e., regulated) output level 320 continues until time 322, at which point the voltage 318 assumes a rate of decay 324 as the energy storage (not shown) is discharged below controllable output levels. However, it is noted that there is an overlap period P2 between times 316 and 322 in which voltages 310 and 318 are both at full output level. As a result, the load served by voltages 310 and 318 is not subject to an interruption in operating power, despite the failure of independent voltage 302.

Second Illustrative Embodiment

Figure 4:
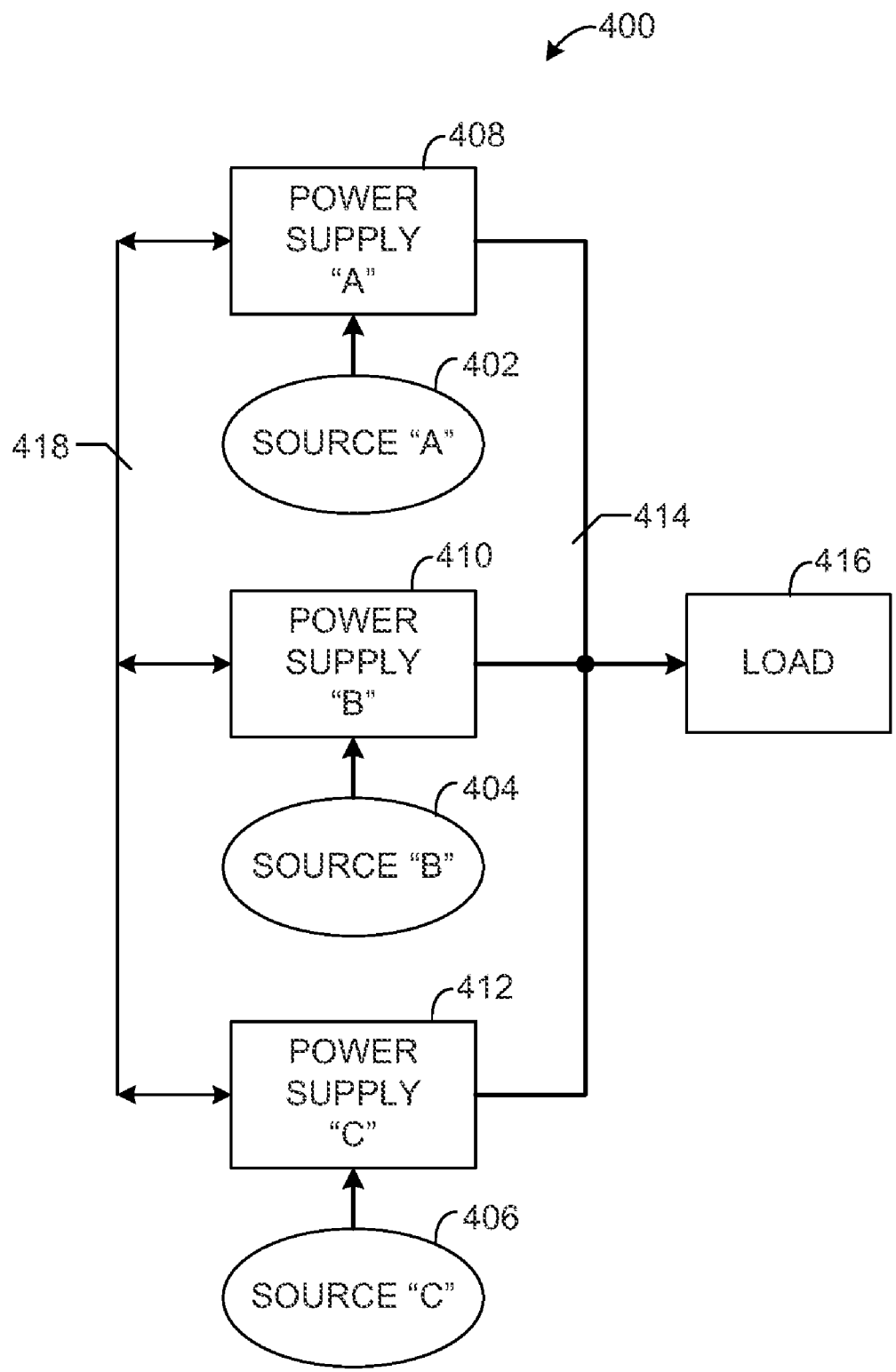
FIG. 4 depicts a block diagram of a system according to another embodiment.

Reference is now directed to FIG. 4, which depicts a block diagrammatic view of a system 400 in accordance with another embodiment. The system 400 is illustrative and non-limiting with respect to the present teachings. Thus, other systems can be configured and/or operated in accordance with the present teachings.

The system 400 includes three independent sources of electrical energy 402, 404 and 406 (inclusive). The sources 402-406 are coupled to provide electrical energy to three power supplies 408, 410 and 412, respectively. In turn, the power supplies 408-412 are each configured to provide some or all of the electrical energy 414 required by a load 416.

The power supplies 408-412 are further respectively configured to communicate signals 418 pertaining to individual operating status, status of the respective independent energy sources 402-406, etc. In this way, the power supplies 408-412 can operate in respective standby and full (normal) output modes, and provide signals 418 to one another when a failure is imminent.

For non-limiting example, power supply "A" 408 can provide for the full energy needs of the load 416, while power supply "B" 410 and power supply "C" 412 operate in standby mode. If power supply "A" 408 detects a failure—that is, any predefined and detectable anomaly—of the energy source 402, then power supply "A" 408 can provide a signal 418 requesting power supply "B" 410 to assume full output operating status. In the event that power supply "B" 410 cannot or does not respond, power supply "A" 408 can provide a signal 418 requesting power supply "C" 412 to assume full operating status. Power supply "A" 408 can provide a brief period of full output power while the responding power supply "B" 410 or "C" 412 completes the transition period from standby to normal (i.e., full) output.

In another non-limiting example, power supplies "A" 408 and "B" 410 provide for respective (e.g., balanced, or fifty percent) portions of the electrical energy 414 required by the load 416, while power supply "C" 412 operates in standby mode. In the event that power supply "B" 410 detects an anomalous condition of the independent power source 404, power supply "B" 410 can provide a signal 418 requesting that power supply "C" 412 assume normal operating mode. The power supply "B" 410 can continue to provide a brief period of normal (full) output, by virtue of energy storage, while power supply "C" 412 completes the transition period from standby to full output mode.

In general, the foregoing description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

What is claimed is:

1. An apparatus, comprising:
a first power supply coupled to an electrical load and a first source of electrical energy, the first power supply configured to issue an alert signal indicative of a failure condition of the first source of electrical energy; and
a second power supply coupled to the electrical load and a second source of electrical energy, the second power supply configured to transition from a lesser output level to a greater output level in response to an activation signal.

2. The apparatus according to claim 1, the first power supply further configured to provide operating power to the electrical load while the second power supply transitions from the lesser output level to the greater output level.

3. The apparatus according to claim 1, the first and second power supplies being coupled such that the activation signal is defined by the alert signal.

4. The apparatus according to claim 1, the electrical load being configured to provide the activation signal to the second power supply in response to the alert signal from the first power supply.

5. The apparatus according to claim 1, the first power supply further configured to transition from a lesser output level to a greater output level in response to a signal indicative of an anomaly in the second source of electrical energy.

6. The apparatus according to claim 1, at least the first or second power supply configured to operate at a lesser output level in response to a standby signal, the first power supply further configured to transition from the lesser output level to a greater output level in response to a respective activation signal.

7. The apparatus according to claim 1 further comprising a third power supply configured to transition from a lesser output level to a greater output level in response to an activation signal.

8. The apparatus according to claim 1, the first power supply further configured to provide operating level power from internal energy storage to an electrical load while the second power supply transitions from the lesser output level to the greater output level in response to the activation signal.

9. A system, comprising:
an electrical load;
a first power supply coupled to a first independent source of electricity and to the electrical load, the first power supply configured to provide a first alert signal indicative of an anomalous condition of the first independent source of electricity; and
a second power supply coupled to a second independent source of electricity and to the electrical load, the second power supply configured to provide a second alert signal indicative of an anomalous condition of the second independent source of electricity, the first power supply further configured to transition from a lesser output level to a greater output level in response to a first activation signal, the second power supply further configured to transition from a lesser output level to a greater output level in response to a second activation signal.

10. The system according to claim 9, at least the first or second power supply further configured to operate at a lesser output level in response to a standby signal.

11. The system according to claim 9, the first and second power supplies respectively configured to provide operating level power to the electrical load for an amount of time sufficient for the other of the first and second power supplies to transition from the lesser output level to the greater output level.

12. The system according to claim 9, the second activation signal defined by the first alert signal, the first activation signal defined by the second alert signal.

13. The system according to claim 9, the electrical load configured to provide the second activation signal in response to the first alert signal, the electrical load further configured to provide the first activation signal in response to the second alert signal.

14. A method, comprising:
asserting a signal responsive to an anomalous condition of a first independent source of electrical energy, the first independent source of electrical energy coupled to energize a first power supply;
transitioning a second power supply from a standby output level to a normal output level responsive to the signal, the second power supply energized by a second independent source of electrical energy; and
providing operating power from the first power supply to an electrical load during the transitioning.

15. The method according to claim 14 further comprising communicating the signal from the first power supply to the second power supply, the second power supply providing operating power to the electrical load after the transitioning to normal output level.

* * * * *